US006070334A

United States Patent [19]

Pretsch, Jr.

[11] Patent Number: 6,070,334

[45] Date of Patent: Jun. 6, 2000

[54] RETAINING BRACKET FOR CARPENTER'S SQUARE

[76] Inventor: Donald C. Pretsch, Jr., 5237 Clifton St., Alexandria, Va. 22312

[21] Appl. No.: 09/018,650

[22] Filed: Feb. 4, 1998

Related U.S. Application Data

[60] Provisional application No. 60/037,823, Feb. 5, 1997.

[51] Int. Cl.[7] .................. B23Q 3/00

[52] U.S. Cl. .................. 33/474; 33/484; 33/838; 248/298.1; 269/91; 269/93; 269/99

[58] Field of Search .................. 33/474, 482, 484, 33/430, 832, 838; 248/298.1, 228.6, 231.71; 269/91, 93, 99

[56] References Cited

U.S. PATENT DOCUMENTS

| | | | |
|---|---|---|---|
| 822,775 | 6/1906 | Schnurr | 269/91 |
| 2,661,783 | 12/1953 | Caston | 269/91 |
| 2,705,441 | 4/1955 | Armstrong | 269/91 |
| 3,286,744 | 11/1966 | Stall et al. | 269/91 |
| 3,623,232 | 11/1971 | Mahlstadt | 33/474 |
| 4,170,345 | 10/1979 | Townsend | 269/99 |
| 4,898,370 | 2/1990 | Saito et al. | 269/91 |
| 5,038,487 | 8/1991 | Johnson | 33/430 |

FOREIGN PATENT DOCUMENTS

| | | | |
|---|---|---|---|
| 1363642 | 5/1964 | France | 269/91 |

*Primary Examiner*—Andrew H. Hirshfeld
*Attorney, Agent, or Firm*—Miles & Stockbridge P.C.; John C. Kerins

[57] ABSTRACT

A retaining bracket is provided for securing a carpenter's square thereto in a desired fixed position relative to the bracket, such that the carpenter's square can be used to mark surfaces of construction materials to be cut. The retaining bracket includes a pair of locking elements captured by and loosely carried in a channel within the bracket and having arm portions positioned outside of the bracket and pins extending through a slot in the bracket connecting the interior and exterior portions of the locking elements, and the arm portions are provided with locking screws which are advanced into contact with the square once the square is properly positioned, to thereby securely fasten the square to the bracket.

7 Claims, 1 Drawing Sheet

RETAINING BRACKET FOR CARPENTER'S SQUARE

This application is directed to an invention that has been described and depicted in U.S. Provisional Application Ser. No. 60//037,823, filed Feb. 5, 1997.

BACKGROUND OF THE INVENTION

1. Field of the Invention

The present invention relates to a retaining bracket for a framing square facilitating the use of a framing square in marking cut lines for stair stringers, and for other marking tasks.

2. Description of Related Art

Stair stringers for wooden staircases are generally marked for cutting using the outside right angle surface of a finishing square or carpenter's square. Heretofore, carpenters have primarily had the option of using the square and manually lining up the square in the proper position for each of the cuts to be made along the stringer, or attaching what are known in the trade as "bugs" to the square to aid in proper placement of the square at points along the stringer for marking the cut lines. The "bugs" are small pieces which can be attached to the edges of the square, as by a clamping action using a locking screw and a backing member adapted to be disposed on opposite sides of the square.

The bugs are secured to the square at positions such that, when the square is brought into position on the top face of the lumber to be cut, the bugs are to abut the side of the lumber, thus properly positioning the square to make the desired marking. While the use of bugs on the square is a definite improvement over unaided hand placement of the square at each marking location on the stringer, the bugs have several disadvantages that preclude fully error-free marking.

The bugs are small, so as to not render the square unwieldy, but, being small, they frequently are lost or not easily findable in a tool box. The bugs are susceptible of being loosened and/or knocked off the square, and must then be reattached, or, if lost in the process, replaced. Further, the lumber that is generally employed to make stair stringers, for example, does not have sharp edges, rather the edges are somewhat rounded. This leads to a less-than-firm or less-than-secure abutment or engagement of the bugs against the lumber, and can lead to slippage of the bugs up and over the edge of the lumber. Considerable time can be lost in having to continually reposition the square when this occurs, and if care is taken to avoid this problem, the work process as a whole is generally slowed down.

It is therefore a principal object of the present invention to provide a retaining bracket or support bracket that is adapted to receive the carpenter's square therein at a range of desired positions, and that is adapted to releaseably lock the square at a given desired position to enable fast use of the square in marking lumber for cutting.

It is a further principal object of the present invention to provide a retaining bracket having the features described in the preceding paragraph, and which provides a workpiece abutment surface for accurately and precisely, yet easily, positioning the square in the proper location for marking the lumber.

It is a further important object of the present invention to provide a retaining bracket for a carpenter's square that permits accurate and precise placement of the square for marking lumber, while allowing the work to be performed more quickly, and without requiring great skill or dexterity.

It is a further important object of the present invention to provide a retaining bracket having an open channel extending along a longitudinal extent thereof, which carries two locking or clamping elements therein for selectively locking a carpenter's square at a desired position

SUMMARY OF THE INVENTION

The above and other objects of the present invention are achieved in the present invention by providing an elongated bracket that has a slot extending along the longitudinal extent of the bracket which leads to an interior channel in the bracket. Two locking elements are captured by the channel, and have a portion extending outwardly of the bracket through the slot, the exterior portion having a locking screw that is adapted to lock or clamp a carpenter's square or other thin, flat instrument to be used in marking, between the exterior portion of the locking element and an exterior surface of the retaining bracket.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment taken in conjunction with the accompanying drawings wherein like reference characters represent like parts throughout the several views.

DETAILED DESCRIPTION OF THE PREFERRED EMBODIMENT

Figures 1, 2:
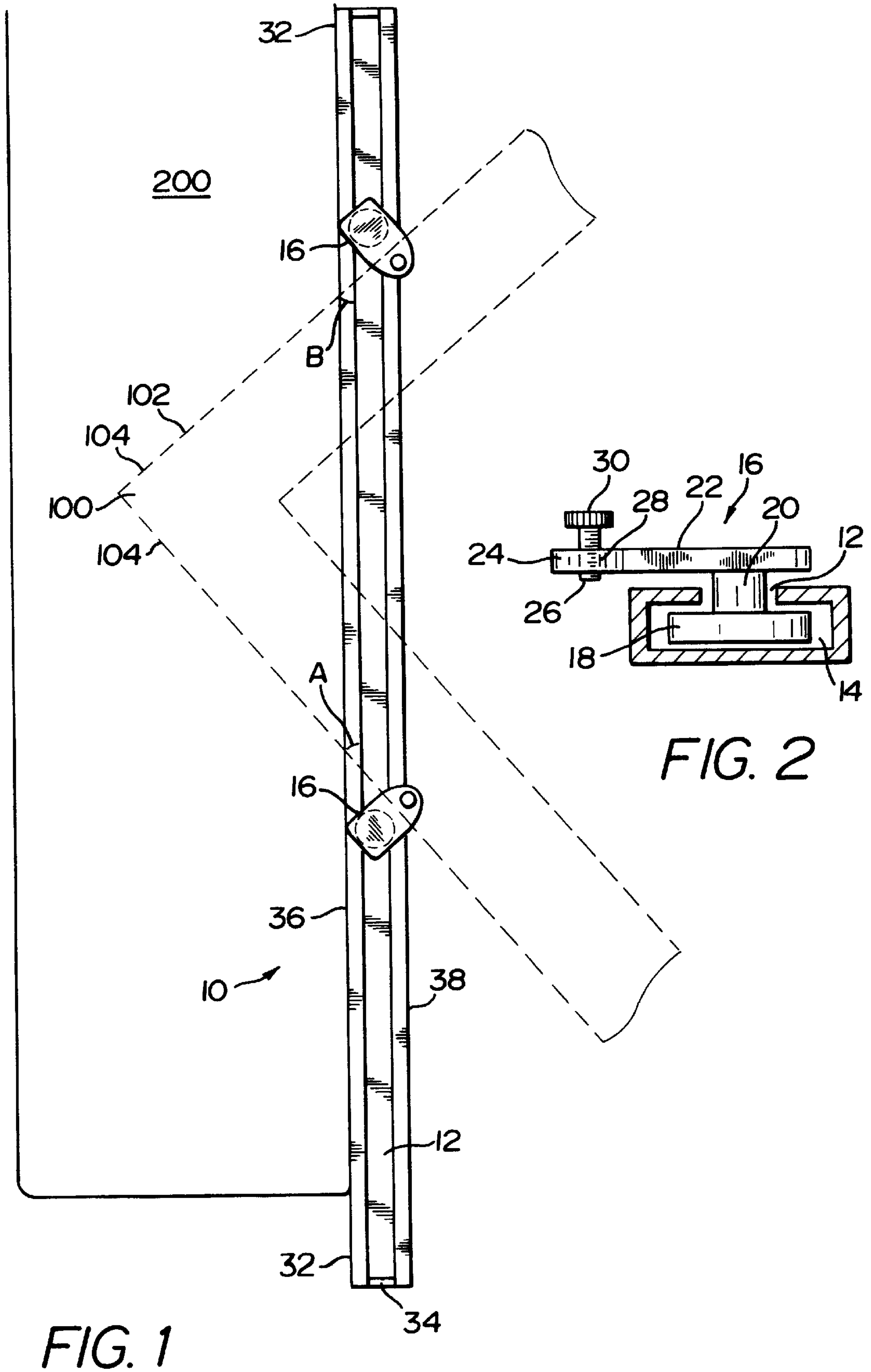
FIG. 1 is a front elevation view of a preferred embodiment of the retaining bracket of the present invention, shown in engagement with a workpiece to be marked.
FIG. 2 is a side view of a preferred embodiment of the locking element, and showing the retaining bracket in cross-section.

Referring initially to FIG. 1, a preferred embodiment of the retaining bracket 10 is shown in engagement with the angled portion 102 of a carpenter's square 100, which is shown in broken lines. The retaining bracket is preferably made by an extrusion of aluminum or other suitable material, and is generally rectangular in cross-section. The bracket 10 is to be in elongated form, on the order of two to three feet (2–3') in length, in order to accept large and small squares, and in order to allow a wide range of positioning of the squares on the bracket.

A slot 12 extends along substantially the entire longitudinal extent of the bracket, and the bracket has a channel 14 extending in the interior of the bracket, also substantially entirely along the longitudinal extent of the bracket, and the slot 12 opens into the channel 14.

Two locking elements 16 are provided on the bracket. Each of the locking elements is made up of a disc 18 of a diameter greater than the size of the gap created by the slot 12, and slightly smaller than 'the width of the channel 14. This size permits the disc to move longitudinally and to rotate freely in the channel, but the disc 18 cannot exit the channel through the slot 12. The disc 18 has a cylindrical pin 20 attached thereto and extending upwardly therefrom. The diameter of the pin 20 is slightly less that the size of the gap created by slot 12. This will allow pin 20 to move longitudinally and to rotate freely while extending through the slot to the exterior of the bracket.

Attached at the upper end of pin 20 is a clamping or locking arm 22, preferably having a length greater than the diameter of disc 18. The clamping or locking arm is mounted to the pin 20 in an off-center manner, such that the free end 24 of the arm 22 can extend past the width of the bracket 10, as best seen in FIG. 2. A locking or clamping screw 26 is disposed on, and extends through, the free end 24 of the arm 22, as close to the edge thereof as is practical, while maintaining sufficient wall thickness to prevent breakage of the arm. The locking screw 26 is threaded through a tapped bore 28 in the arm 22, such that the screw can be advanced and retracted, as desired, by turning knob 30 disposed at an upper extent of the locking screw 26.

The bracket 10 is initially assembled by inserting the disc portions 18 of the locking elements 16 into the open ends of channel 14, and then closing off the ends 32 of the channel to permanently retain the locking elements therein by inserting end caps 34, or simply by crimping the portions of the bracket adjacent the slot 12, such that the discs 18 will no longer be able to pass through the ends of the bracket 10. Once assembled, the locking elements 16 are retained in the channel 14, and are free to move longitudinally and to rotate through 360° into various positions.

As noted previously, the outside right angle edges 104 of a carpenter's square is used to mark lumber that is to be cut into stair stringers. Accordingly, when the carpenter or other worker wishes to commence marking and cutting of the lumber using the retaining bracket of the present invention as an aid, he will secure the square to the retaining bracket as will now be discussed.

The left side 36 of the bracket will, in the illustration of FIG. 1, be used to abut the side of the piece of lumber in order to aid in properly positioning the square to make the desired markings. It is to be understood that the right side 38 of the bracket is equally susceptible of being used as the abutment surface, were the square 100 flipped over such that the outer right angle edges 104 protrude from the bracket 10 in the direction of the right side.

Since the left side of the bracket will abut the side of the piece of lumber, the worker may use the upper edge of the left side 36 of the bracket to align and position the square 100, which will have distance indicia thereon, such that markings of the desired lengths can be made. It will be well understood in the art that, in cutting stringers for stairs, for each stair, a cut is made to provide a surface for the stair tread to be fastened, and a right angle cut is made for the riser portion of the stairs.

As a simple example, if the cuts in the lumber are to be made seven inches for the stair tread and seven inches for the riser, the worker positions the square such that the seven inch marks A, B, are lined up on the upper edge of the left side 36 of the bracket. Portions of the two legs of the square will rest on the upper surface of bracket 10. The locking elements 16, which preferably had been positioned to straddle the legs of the square, are moved toward the square until pins 20 contact the edges of the square. Then, the free ends 24 of arms 22 are rotated such that the locking or clamping screws 26 are positioned over the upper flat surfaces of the legs of the squares. The knobs 30 are then turned in the direction necessary to advance the locking screws 26 through the arms 22, until the screws tightly engage the square 100.

While it may be preferable in some instances to have the locking screws 26 lie atop not only the square, but also the upper surface of the bracket, thereby enabling the square to be secured directly between the screw 26 and the top of the bracket, positioning the screw with such degree of precision is generally not necessary. The square will be firmly locked in place by the clamping action of the locking screw 26 and the engagement of the top surface of disc 18 with the inner surface of bracket 10 adjacent the slot 12. This engagement is brought about by the advancing of the locking screw 26 toward the square, in that, once the screw contacts the square, further turning of the screw will operate to raise arm 22, pin 20 and disc 18, and the screw can be tightened until there is a secure engagement of the disc and the bracket to thus secure the square.

The freely rotatable locking elements thus greatly facilitate securing the square at its desired position, without requiring a great deal of precision in lining up the locking elements with other components. The operator need merely rotate the arm 22 to a position where the locking screw overlies the square, which is very easy to confirm visually.

Once the square is secured to the bracket in its desired position, the edge of the bracket, in FIG. 1, the left edge 32 of the bracket 10 is placed against the side of the piece of lumber 200 to be marked and cut, and the outer angle edges of the square are used to guide a marking instrument in generating cut lines. As noted previously, the edges of this type of lumber are generally slightly rounded. However, this bracket of the instant invention assures a firm engagement with the side of the piece of lumber, in that the bracket is of sufficient depth that it will engage the lumber further down the side of the board, where the surface is flatter and squarer to the upper surface to be marked.

The foregoing description of the preferred embodiment of the present invention is provided for illustrative purposes only. It is to be understood that various changes and modifications to the invention may be apparent to those of ordinary skill in the art, and that those changes or variations do not depart from the spirit or scope of the present invention. Specifically, while the retaining bracket has been described and illustrated as configured to work with a square, the bracket may be used to secure other measuring or marking instruments in position, and the bracket may be modified accordingly. Accordingly, the spirit and scope of the present invention is to be determined by reference to the appended claims.

What is claimed is:

1. A retaining bracket assembly for releaseably securing a flat measuring instrument in a fixed position relative to said bracket assembly, said bracket assembly comprising:

an elongated bracket member having a slot extending through an upper surface, said slot extending along a predetermined length of said bracket member, said bracket member having an internal channel in communication with said slot, said channel also extending along said predetermined length of said bracket member;

at least two locking members each having a first portion thereof captured and loosely retained in said channel, and each having a second portion disposed outside said bracket member, each of said first and second portions being joined by a pin extending through said slot;

wherein said second portion of each of said locking members has an arm that extends away from its respective said pin and carries thereon means for securely clamping a flat measuring instrument against said upper surface of said bracket member, each of said arms extending a predetermined distance away from its respective pin so as to position each of said instrument clamping means outwardly past a width of said upper surface of said bracket member; and wherein said bracket member has a depth sufficient to securely abut against a side of a workpiece that is to be marked using said flat measuring instrument.

2. A retaining bracket assembly as recited in claim 1, wherein each of said arms comprises a substantially planar element having a tapped bore therethrough, and wherein each of said instrument clamping means comprises a threaded member extending through its respective tapped bore.

3. A retaining bracket assembly as recited in claim 1, wherein said slot in said upper surface and said channel extending through said bracket member extend along substantially the entire length of said bracket member.

4. A retaining bracket assembly as recited in claim 3, wherein said locking members are prevented from separating from said bracket member by end caps fitted into said channel at each end of said bracket member.

5. A retaining bracket assembly as recited in claim 1, wherein said bracket member is an elongated metal channel element of substantially uniform wall thickness.

6. A retaining bracket assembly as recited in claim 5 wherein said channel element forms two mutually parallel side walls extending downwardly from said top surface to form abutment surfaces against which the bracket member may rest against a side of a workpiece.

7. A retaining bracket assembly as recited in claim 1, wherein said at least two locking members are each freely rotatable with respect to said bracket member.

* * * * *